United States Patent [19]
Mahler et al.

[11] 3,751,106
[45] Aug. 7, 1973

[54] SECUREMENT OF COVERING ABOUT VEHICLE CONTOURED SUNVISOR

[75] Inventors: Gert Mahler, Radevormwald; Gerhard Zwirner, Dusseldorf, both of Germany

[73] Assignee: Gebr Hoppich GmbH, Wuppertal-Elberfeld, Germany

[22] Filed: July 28, 1971

[21] Appl. No.: 166,681

[30] Foreign Application Priority Data
Nov. 7, 1970 Germany.................. P 20 54 953.5

[52] U.S. Cl............... 296/97 H, 24/201 C, 160/385
[51] Int. Cl............................................... B60j 3/00
[58] Field of Search............. 296/97 H, 97 R, 97 K; 160/382, 385, 386; 297/452, DIG. 1; 24/201 C

[56] References Cited
UNITED STATES PATENTS

| | | | |
|---|---|---|---|
| 3,632,164 | 1/1972 | Radke | 297/DIG. 1 |
| 2,703,603 | 3/1955 | Endicott | 297/DIG. 1 |
| 2,901,028 | 8/1959 | Bottemiller | 297/DIG. 1 |
| 3,103,082 | 9/1963 | Baermann | 297/DIG. 1 |
| 3,266,066 | 8/1966 | Bereday | 297/452 X |
| 3,425,469 | 2/1969 | Ausnit | 24/201 C |
| 3,429,610 | 2/1969 | Bornefeld | 296/97 R |

*Primary Examiner*—Benjamin Hersh
*Assistant Examiner*—John A. Pekar
*Attorney*—Sidney G. Faber et al.

[57] ABSTRACT

Means for securing the cover wrapping of a sunvisor to the concavely curved side of the contoured sunvisor body through bonding covering material to a structural support wire of the visor located within the deepest concave region of the body of the visor.

12 Claims, 6 Drawing Figures

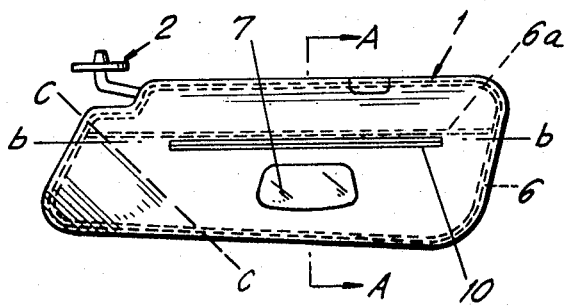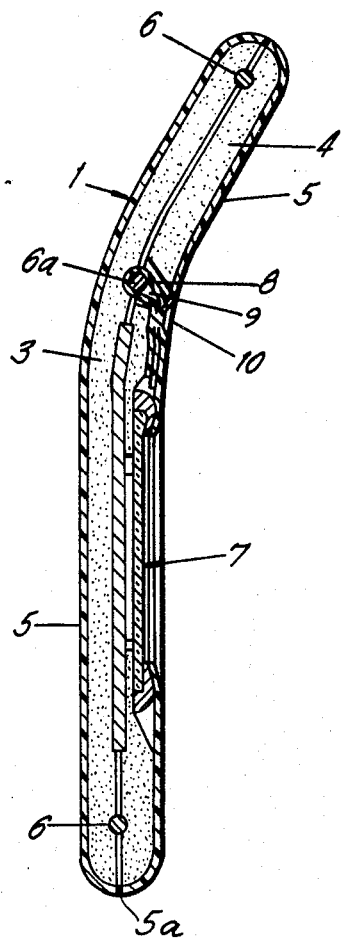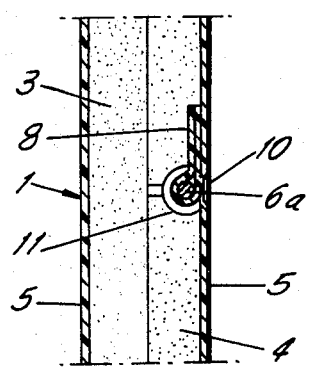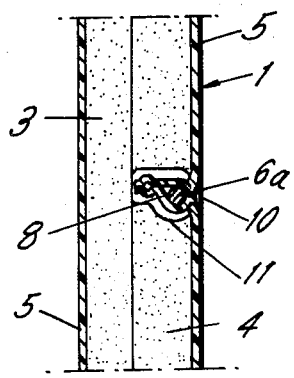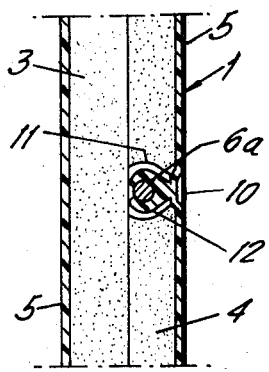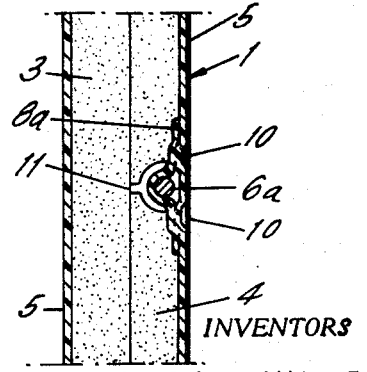
INVENTORS
GERT MAHLER
GERHARD ZWIRNER
BY Ostrolenk, Faber, Gerb & Soffen
ATTORNEYS

SECUREMENT OF COVERING ABOUT VEHICLE CONTOURED SUNVISOR

This invention relates to sunvisors for motor vehicles, and the like, which visors are generally flattened and may be bent or curved to conform to the countour of the adjacent portion of the vehicle interior. Such a visor is curved and has a concave side, which normally faces toward the interior of the vehicle. At least one curvature is about an axis parallel to the longitudinal direction of extension of the visor, i.e., the width of the window above which the visor is normally positioned. In an alternate arrangement, the curved shape of the visor is advantageously combined with the interior of a reinforced, arched vehicle roof. In a further variation, the concave side of the visor faces away from the vehicle interior.

Visors of this type type previously could not be made with the same level of technical and optical effectiveness and their exterior coverings could not remain as smooth over as prolonged a period of time as can be obtained with visors that are essentially flat or only slightly curved. The difficulty arises in providing a uniformly smooth and enduring curved covering for the visor padding over the concavely curved side of the visor. This has been accomplished by cementing the foil like covering over the shaped padding base of the visor. However, under usual manipulation of the visor and the frequently wide temperature variations to which a visor is exposed over an extended period of time, the foil covering loosens, at least in the deepest concave region of the visor. The foil covering then no longer presents a smoothly contoured appearance and may even shift off the visor padding base beneath. Attempts to weld the visor covering to the padding base have likewise failed because the padding body is not formed of a weldable material and the visor to padding welded joint lacks sufficient strength to hold the covering in place at the deepest concave region of the visor over the useful life of the visor.

It is a primary object of the invention to provide a vehicle sunvisor, which overcomes the above mentioned disadvantages and which is simply and inexpensively produced.

In accordance with the invention, a part of the wire frame support for the padding base of the visor is located within the deepest, concavely curved region of the visor, and the foil like visor covering is joined to this part of the visor wire frame. By attaching the covering to this portion of the wire frame with known means, a covering to wire frame junction is obtained, which should withstand all normal operating and ambient conditions.

The padding base of the visor so covers the interior support wire frame that the portion of the wire frame at the concave region of the visor is normally inaccessible for attachment to the visor covering. An appropriate opening or slit is made in a side wall of padding to provide access to the wire. In certain embodiments of the invention, the portion of the wire frame at the deep region of the concave side is spaced away from the padding material to facilitate joining thereto of the visor covering. This is particularly advantageous when the junction between frame and covering is made with cement.

Joining of frame and covering may be accomplished by wrapping the exposed region of the wire frame with weldable material, which is joined to or is made part of the visor covering. Alternatively, if the wire and covering are made from appropriate materials, the covering may be joined directly to the wire frame by a welding operation.

In a preferred arrangement, a short length weldable foil strip is wrapped about the wire and its free ends are joined to each other and to the visor covering. With such an arrangement, all regions of the wire frame are guarded against undesirable contact and viewing. The opening in the visor body for wire 6a could be profiled to receive that wire and the elements, if any, which help join the wire and covering.

In a further variation, a separate clamp like joining element may be clamped on the frame wire at the deepest concave region of the visor and the foil like covering may be joined to this.

The present invention is further illustrated in a number of embodiments in the accompanying drawings, in which:

FIG. 1 is a front elevation view of the concave side of a sunvisor in accordance with the invention;

FIG. 2 is a cross-section view along the line and in the direction of arrows A—A of the visor of FIG. 1;

FIGS. 3–6 provide fragmentary cross-sectional views of various modifications of a visor viewed similarly along a line equivalent to A—A of the visor of FIG. 1.

Turning to FIGS. 1 and 2, sun visor 1 is supported inside a vehicle body (not shown) by bearing 2. The visor includes two padding layers 3, 4, formed of a thick, perhaps porous fabric, foamed plastic, foamed rubber, or the like. Layers 3, 4 are completely covered by a wrapped about thin foil like covering 5 of appropriate surface material, e.g., a fabric, vinyl plastic, real or simulated leather, or the like. In accordance with the preferred embodiment, the material of covering 5 is weldable, e.g., by heat sealing, vinyl plastic. Covering 5 is formed from a single sheet material element which is wrapped about the padding layers and is welded to itself along edge seam 5a. Wire frame 6 is held between padding layers 3, 4. Central horizontal wire 6a of wire frame 6 cooperates in securing covering 5 on the visor, as described below.

Makeup mirror 7 is secured on the downwardly depending portion of the concave side of visor 1. The details of the mirror and of its setting and the rearward stiff wiring therefor are not further discussed.

As shown in FIG. 2, visor 1 has a curvature about an axis $b$—$b$ in FIG. 1, which axis is parallel to the longitudinal direction of extension of the visor and to the front of the vehicle if, as is usual, the visor is positioned over the front window of the vehicle. The lower corner region of visor 1 at its side near the outside of the vehicle (left in FIG. 1) further includes a curvature about axis $c$—$c$ of FIG. 1. This curvature crosses the curvature about axis $b$—$b$. These curvatures cause visor 1 to conform to the vehicle interior contour. The intersecting curvatures of visor 1 do not interfere with interior frame 6 as this frame either does not extend into the corner region defined by the curvature axis $c$—$c$ or frame 6 is appropriately curved to conform.

Frame central wire 6a extends across visor 1 in the region of the deepest portion of the curvature about axis $b$—$b$. Central wire 6a of frame 6 is utilized for holding covering 5 to the visor padding in the deepest region of the curvature of the concave side of the visor.

In FIG. 2, a single short length, but elongated width foil strip 8 of weldable or fusable material, such as a fusable metallic or vinyl fabric or an adhesive coated fabric, passes around central frame wire 6a. The free end flaps or extensions of foil strip 8 pass through elongated narrow slit opening 9. Opening 9 is at the concave side of and away from the peripheral edges of padding layer 4. Opening 9 and wire 6a are generally aligned and adjacent to each other. Strip 8 is of about the width of opening 9. The strip end flaps extend downward inside covering 5 toward mirror 7. Then the contacting free ends of strip 8 and the adjacent portion of the covering 5 are all welded or fused to each other at junction 10, by means operating externally to the visor, e.g., a pressure applicator if the bonding material is cement, or a heat applicator if the weldable elements are of vinyl plastic. This provides complete and safe anchoring of foil strip to wrapping 5 at the deepest concave region of visor 1, without any externally visible fastening means being required. An enduring, attractive, safe, smoothly surfaced and concavely shaped sunvisor results.

FIGS. 3-6 show portions of further examples of visors made in accordance with the invention at the region of frame central wire 6a. The illustrated visors are not shown as being curved. However, the present invention is particularly useful in connection with curved visors.

In FIG. 3, wire 6a is positioned in cavity 11 in padding layer 4. Access into cavity 11 is through an opening like 9. Strip 8 is in cavity 11 and passes over central wire 6a. The strip end flaps overlap each other within exterior covering 5 and contact the covering. The three superimposed foil layers are joined to each other at junction 10 by appropriate cementing, welding, fusing or the like.

In FIG. 4, central wire 6a in groove 11 is likewise surrounded by foil strip 8 of appropriate fusable material. The two free ends of strip 8 extend into groove 11, toward padding layer 3, past central wire 6a and are joined to each other by appropriate fusing. Fused junction 10 joins foil strip 8 with the adjacent portion of covering 5 outward of wire 6a.

In FIG. 5, central wire 6a is not surrounded by a foil strip. Instead, wire 6a is embraced by a longitudinally extending clamping strip 12 which is appropriately profiled to fit within groove 11 in padding layer 4. Clamping strip 12 is formed of a resilient material so as to embrace central wire 6a. It is also formed of or coated with an appropriate fusable material so as to be able to be joined to covering 5 by fusion along junction line 10. Strip 12 may be formed of a tube of appropriate fusable material which has a longitudinal slit, shown on its left in FIG. 5, which permits wire 6a to be snapped into the receiving opening of strip 12 and which permits the clamping strip to apply a clamping force on wire 6a. Strip 12 might also be closed, in which event wire 6a would be inserted through one of the open ends of the tubing of strip 12.

In all of the above described examples, junction 10 is formed only with a single fusion joint. In FIG. 6, on the other hand, strip 8 of fusable material is disposed within exterior foil covering 5, passes over the interior side of wire 6a, within groove 11 and is fused along two respective longitudinal fusion joints 10 above and below wire 6a to covering 5.

There has just been described several embodiments of a novel, smooth surfaced vehicle sunvisor. The invention is particularly useful for curved or contoured visors for holding the covering of the visor securely in place.

Although the present invention has been described in connection with preferred embodiments thereof, many variations and modifications will now become apparent to those skilled in the art. It is preferred, therefore, that the present invention be limited, not by the specific disclosure therein, but only by the appended claims.

We claim:

1. In a vehicle visor, comprising a relatively flattened body, a supporting frame within said body, and a covering wrapped about said body; said body having two large opposite side surfaces joined at thin peripheral edges around said body;

the improvement comprising, said body including an access opening providing access from the exterior of said visor to a portion of said frame that is positioned adjacent to said opening; said access opening being in one of said side surfaces and away from said visor edges; said access opening being an elongated slit and said frame portion being correspondingly elongated and generally aligned with said slit, whereby said covering is anchored along a substantial distance;

said covering being secured to said frame portion through said access opening.

2. In the vehicle visor of claim 1, wherein said covering is formed from at least one strip wrapped about said body;

the improvement further comprising, means secured to said frame portion for joining said frame portion to said covering.

3. In a vehicle visor, comprising a relatively flattened body, a supporting frame within said body, and a covering wrapped about said body, said body having two large opposite side surfaces joined at thin peripheral edges around said body;

said visor being curved about an axis such that one of said side surfaces is concave; said concave surface having a region of deepest concavity;

the improvement comprising, said body including an access opening providing access from the exterior of said visot to a portion of said frame that is positioned adjacent to said opening; said access opening being in one of said side surfaces and away from said visor edges;

said covering being secured to said frame portion through said access opening;

said access opening and said adjacent frame portion being at said deepest concave region.

4. In the vehicle visor of claim 3, the improvement further comprising, said access opening being an elongated slit which is substantially aligned with said visor curvature axis, and said frame portion being correspondingly elongated and generally aligned with said slit, whereby said covering is anchored along a substantial distance.

5. In the vehicle visor of claim 4, wherein said covering is formed from at least one strip wrapped about said body;

the improvement further comprising, means secured to said frame portion for joining said frame portion to said covering.

6. In the vehicle visor of claim 5, wherein said frame is comprised of wires;

the improvement further comprising, said frame portion being a wire.

7. In the vehicle visor of claim 5, the improvement further comprising,
said means secured to said frame portion comprising a strip passing around said frame portion and having free ends which are secured to said covering.

8. In the vehicle visor of claim 7, the improvement further comprising, said strip free ends being positioned for and being secured to each other.

9. In the vehicle visor of claim 8, wherein said covering and said strip free ends are comprised of materials permitting fusion together thereof.

10. In the vehicle visor of claim 5, the improvement further comprising, said means secured to said frame portion comprising a strip passing around said frame portion and having free ends extending past said frame portion and further into said access opening; said free ends being secured to each other on the side of said frame portion which is away from said access opening; said securing means strip being secured to said covering on the side of said frame portion facing toward said access opening.

11. In the vehicle visor of claim 5, the improvement further comprising, said access opening being defined by a wall with a predetermined contour; said means for joining said frame portion to said covering having an exterior contour which is complementary to the said interior contour of said slit.

12. In the vehicle visor of claim 11, the improvement further comprising, said means for joining comprising a clamping device including arms which resiliently grasp said frame portion, thereby holding said means for joining stationary.

* * * * *